United States Patent [19]

Pricer

[11] 3,876,992

[45] Apr. 8, 1975

[54] BIPOLAR TRANSISTOR MEMORY WITH CAPACITIVE STORAGE

[75] Inventor: Wilbur David Pricer, Burlington, Vt.

[73] Assignee: International Business Machines Corporation, Armonk, N.Y.

[22] Filed: May 6, 1974

[21] Appl. No.: 466,936

Related U.S. Application Data

[63] Continuation of Ser. No. 302,963, Nov. 1, 1972, abandoned.

[52] U.S. Cl. ........... 340/173 CA; 307/238; 307/279

[51] Int. Cl. ....................... G11c 11/24; G11c 11/40

[58] Field of Search ................. 340/173 CA, 173 R; 307/238, 279

[56] References Cited

UNITED STATES PATENTS

| | | | |
|---|---|---|---|
| 3,196,405 | 7/1965 | Gunn | 340/173 CA |
| 3,614,749 | 10/1971 | Radcliffe | 340/173 CA |
| 3,614,753 | 10/1971 | Wahlstrom | 340/173 CA |
| 3,715,732 | 2/1973 | Lynes | 340/173 CA |
| 3,740,731 | 6/1973 | Ohwada | 340/173 CA |

*Primary Examiner*—Stuart N. Hecker
*Attorney, Agent, or Firm*—Francis J. Thornton

[57] ABSTRACT

The memory is formed of an array of cells, each of which is coupled to the word and bit lines. Each cell comprises only a bipolar transistor coupled to a capacitor. The base terminal of the transistor is connected directly to the word line and either the emitter terminal or the collector terminal of the transistor may be coupled in series with the capacitor. In one embodiment the transistor, in series with the capacitor, is connected between a bit/sense line and a reference voltage and in another embodiment between the bit line and a sense line.

Information is stored in the capacitor by discharing the capacitor through the transistor and information is read out by charging the capacitor. During a read/erase operation the word line, which is normally at a quiescent voltage, is raised to a higher voltage to render the transistor conductive between its collector and emitter. Simultaneously, the bit line has impressed upon it a positive voltage. During a write operation the word line has impressed upon it a voltage which is between its quiescent voltage and its read/erase voltage. If a 0 is to be stored, the bit line is maintained at a high level and the capacitor charged. If a 1 is to be stored, the voltage on the bit line is substantially reduced so that the capacitor is discharged. During the read operations a signal is transmitted to the bit line if a 1 has been stored previously.

11 Claims, 4 Drawing Figures

BIPOLAR TRANSISTOR MEMORY WITH CAPACITIVE STORAGE

This is a continuation of application Ser. No. 302,963 filed Nov. 1, 1972, now abandoned.

BACKGROUND OF THE INVENTION

1. Field of the Invention

This invention is applicable to memory systems and more particularly to a memory system utilizing bipolar transistors.

2. Description of the Prior Art

U.S. Pat. No. 3,553,658 assigned to the same assignee as the present invention teaches that active storage arrays can be created using two diodes per store bit and the information stored therein can be sensed with a differential amplifier. The non-destructive sensing of such an array is based on the fact that the capacitances of each diode in the pair is directly altered by this charge stored mutually in them.

However, such systems have a fundamental limitation due to the fact that it is difficult to consistantly achieve exactly the same reverse voltage characteristic in every diode. For small systems, for example a thousand bit array, this disadvantage does not exist, for all the diodes can be tested and matched. However, when a system requires very large numbers of storage bits, for example a million bit system, or is fabricated in a monolithic structure, such testing and matching becomes so expensive that the described system becomes economically impractical. Moreover, the described system utilizes the reverse breakdown of the device rectifying junction and it has been found that repeated breakdowns of the reverse characteristics of the diodes leads to long term instability and reliability problems unless the signal voltage/drive voltage ratio of this system is reduced to below its optimum level.

U.S. Pat. No. 3,387,286 assigned to the same assignee as the present invention discusses the Field Effect Transistor memory in which an array of memory cells composed of Field Effect Transistors and capacitors is utilized to store and record binary information. In essence the binary information is stored by storing a charge on the capacitor which is either a diffused capacitor or the gate to substrate capacitance of the Field Effect Transistor itself.

Although such FET arrays have many advantages such as high density and low cost, they have a distinct speed disadvantage when compared to bipolar transistor arrays. Not only is the bipolar array faster, but all support and other peripheral circuits can be also made in the faster bipolar mode. Thus the such FET based systems are not desirable when a fast memory system is required.

U.S. Pat. No. 3,614,753 teaches that a one device per bit random access memory array can be constructed of bipolar devices having a resistive element in the base leg thereof and a capacitive element coupled to the collector of the bipolar transistor. The transistors used are bidirectionally conductive and information storage is accomplished by storing charge in the capacitor coupled to the active device.

The resistive element coupled to the base of each of the transistors in this memory array defeats some of the advantages that this array has over the FET type arrays because this resistor not only severely limits the speed of the array in the associated circuits but also limits the size of the entire storage area. The use of this base resistor also requires increased current which increases power and cooling requirements. The size limitation imposed upon the array cell by such a resistor becomes especially important when one desires to integrate such an array in a very small semiconductor body. Such integration is utilized in order to not only decrease the cell size but to improve cost requirements, voltage and current requirements. It is also more difficult to fabricate large numbers of such cell resistors repeatedly with the same tolerances and to accept the usual variation normally encountered in fabrication of such resistors. The system thus necessarily must use a non-optimum signal voltage to drive voltage ratio.

SUMMARY OF THE INVENTION

The present invention teaches a memory storage system utilizing storage cells, each of which comprises a bipolar transistor coupled directly to the word and bit lines of the system and to a capacitive storage device.

The present invention, in particular, deals with the dynamic bipolar random access memory cell, consisting of a single bipolar transistor connected to a single capacitor, which may be constructed in an area substantially smaller than that known previously by eliminating the resistor required by the prior art and using multi-level voltage pulsing.

The present invention is thus capable of utilizing an optimum signal voltage to drive voltage ratio.

Another object of the invention is to provide an improved memory system capable of being fabricated in a size smaller than that taught in the prior art.

Still another object of the invention is to provide an improved memory system with a low operating voltage and which does not depend on the reverse voltage breakdown characteristics of the active devices used in the system.

Still a further object of the invention is to provide a system which operates at lower voltage and current levels than the prior art and thus provides a longer term reliability than can be provided by the prior art.

Further, the system is particularly adaptable to the use of the so-called semiconductor integrated circuits techniques which permits the system to be built less expensively than the arrays of the prior art.

The foregoing objects, features and advantages of the invention will be apparent when the following more particular description of the preferred embodiments that have been mentioned taken in conjunction with the accompanying drawings.

DESCRIPTION OF THE INVENTION

Figure 1:
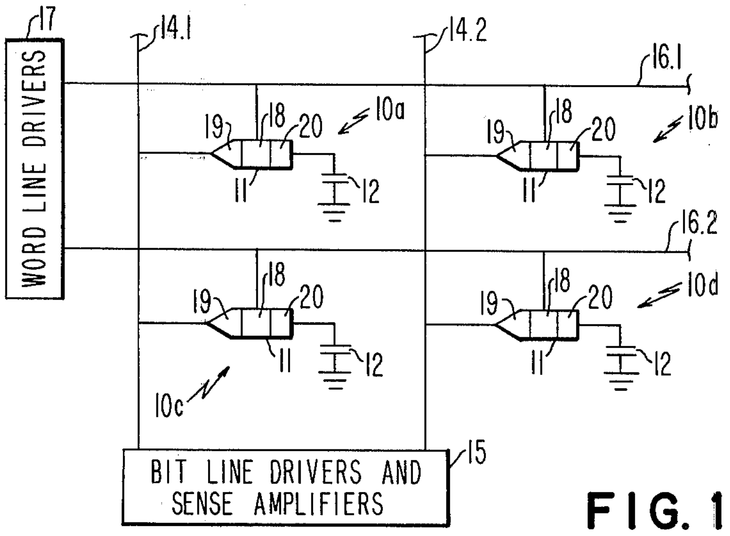
FIG. 1 is a diagramatic illustration of a simple memory system employing the concepts of the present invention.

Referring now to the drawings in more detail there is shown in FIG. 1 a planar array of a plurality of memory devices in accordance with the invention. For purposes of illustration only, it will be assumed that the memory system shown in FIG. 1 is a 2×2 array of 4 memory cells 10a, 10b, 10c and 10d, each of which is formed of only a bipolar transistor 11 and a capacitor 12.

It should be understood, however, that although only 4 cells are shown in FIG. 1 that in actual practice substantially larger memories including thousands of memory cells are employed.

The system comprises a plurality of vertical bit lines 14.1 and 14.2, each of which is connected through appropriate bit line drivers and sense amplifiers 15. A plurality of horizontal word lines 16.1 and 16.2 are in turn connected to suitable word driver circuits 17. The word lines 16.1 and 16.2 are orthogonal to the bit lines 14.1 and 14.2 and the memory cells 10a, 10b, 10c and 10d interconnect the word lines and the bit lines at an intersecting point.

The bit line drivers 15 are conventional and have the capability of impressing upon the bit lines positive voltage potentials of different levels. The word line drivers 17 are also conventional and also have the capability of impressing on the word lines positive voltage potentials of different levels.

Each transistor 11 in each memory cell has a base region 18, an emitter region 19, and a collector region 20. The base region 18 of each transistor is coupled to an appropriate word line and the emitter region of each transistor coupled to an appropriate bit line. The capacitor 12 of each cell is connected between the collector 20 of the cell transistor and ground.

The memory array shown in FIG. 1 may be word organized and is operated on a read/write cycle basis with the information being read out of or written into any particular cell by the coincidence of applied signals through a respective word line and a respective bit line. The operation of the memory cell shown in FIG. 1 will be described and attention is directed to FIG. 2 which shows the pulse program to be applied to the word lines and the bit lines to write or to read 1's and 0's into or out of a particular cell.

Referring specifically to one particular memory cell, for example cell 10a, the information, a binary 1 or a binary 0, to be stored in the cell is determined by the voltages applied to the word and to the bit lines, respectively. When storing or writing a binary 1, for example, the word driver for word line 16.1 is changed to raise the voltage on the word line 16.1 and thus the base 18 of the transistor 11 of cell 10a from zero volts to approximately +1 volt. This is shown as pulse 21 in FIG. 2. Coincidentally, the bit line driver for bit line 14.1 is changed to reduce the emitter 19 of transistor 11 of cell 10a from its normal quiescent voltage of +4 volts to about +0.3 volts. This is shown by pulse 22 in FIG. 2. These voltages as such as to forward bias the transistor 11 in cell 10a. Because the collector 20 of transistor 11 in cell 10a is now more positive than its emitter 19, the capacitor 12 coupled to the collector is discharged through the transistor 11 and a 1 is stored in the cell.

Reading of the cell after the storage of a signal in the cell is performed by placing the collector base junction of the transistor 11 in a forward bias mode such that the emitter of the transistor being read is more positive than the collector. This is accomplished for the same cell 10a by maintaining the bit line 14.1 at its quiescent voltage of +4 volts and raising the word line 16.1 from zero volts to about +3.7 as shown by pulse 23 of FIG. 2. This voltage coincidence on cell 10a causes transistor 11 in cell 10a to become conductive from its emitter to its collector. Because the emitter 19 is now more positive than the collector 20, current flows through the transistor from the bit line 14.1 and the capacitor 12 becomes charged. This charging current flowing through the transistor appears as a voltage drop 24 on the bit line 14.1, indicating that a 1 had been previously stored in the capacitor 12. This voltage drop 24 on bit line 14.1 appears as a signal in the sense amplifier associated with the line. From the sense amplifier such a signal can be transmitted to other data processing equipment as desired. Such a reading action because it charges capacitor 12, erases the 1 information previously stored in the cell. Thus wherever the cell is read it must be restored to its previous condition thus for the given case if the cell is to be maintained as indicating a 1 storage therein a write 1 cycle must be applied to the cell.

Figure 2:
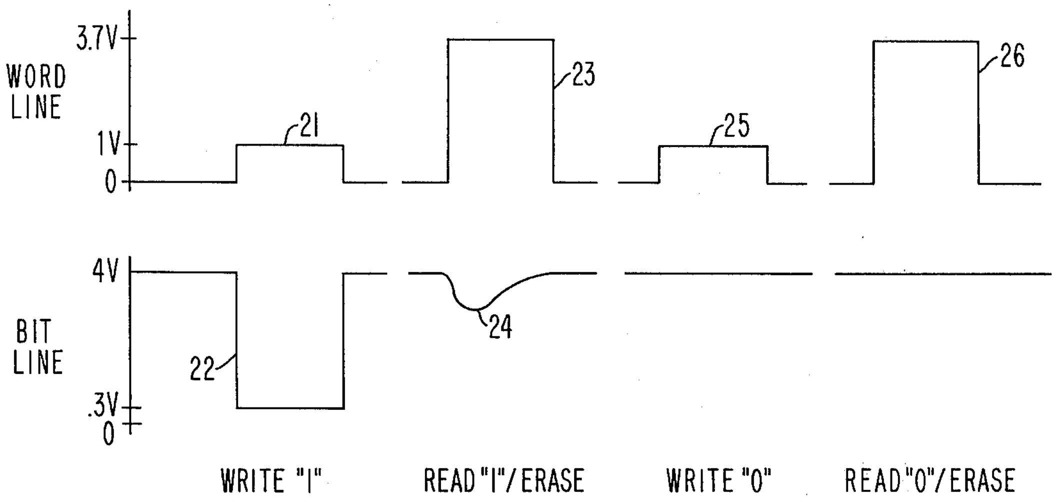
FIG. 2 illustrates the pulse pattern used to read, write and erase binary information in the memory cells of the system of FIG. 1.

When writing or storing a binary 0, the word driver for word line 16.1 is again raised to approximately 1 volt as shown by pulse 25 of FIG. 2, while the bit line driver for line 14.1, is maintained at its normal quiescent voltage of +4 volts. These voltages are such as to maintain the emitter 19 more positive than the collector 20. Since a read/erase cycle always precedes a write cycle and further since such a read/erase cycle charges the capacitor, the capacitor 12 coupled to the collector is in a 0 state and remains in this state.

Reading of the cell after storage of a 0 is performed in a manner identical to that used to read a 1 in the cell. That is, the collector base junction of the transistor is placed in a forward bias mode by maintaining the bit line 14.1 at its quiescent voltage of +4 volts and raising the word line 16.1 from 0 volts to 3.7 volts as shown by pulse 26 of FIG. 2. This again causes transistor 11 in cell 10a to be conductive from its emitter to its collector because once again the emitter 19 is at a higher positive voltage than the collector 20. However, in this case because the capacitor 12 has been previously charged by application of the write 0 pulse current does not flow through the transistor and no signal appears on the bit line 14.1. In this instance because no voltage drop appears on the bit line a 0 is read out of the bit line 14.1.

This use of different voltage levels in reading and writing the cell eliminates the necessity of having a resistor in the base leg of the transistor, thus the cell is faster than that of the prior art. Further, the actual value of the transistor beta, both forward and reverse beta, becomes less critical. At present, transistors produced using integrated circuit techniques have forward betas of between 20 and 100, while their reverse betas are between 1 and 2. Because the base resistor has been eliminated, it is no longer necessary to maintain the reverse beta of the transistor above 2 as was required by the prior art. Of course, transistor having reverse betas greater than 2 can also be used in the described cell.

Figure 3:
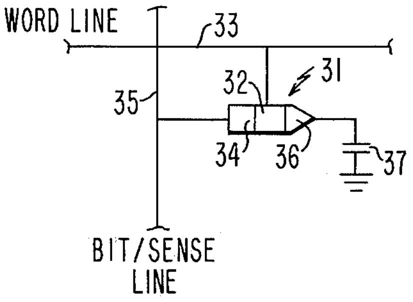
FIG. 3 shows an alternate configuration for the transistor in the cell of FIG. 1.

FIG. 3 shows another embodiment of the storage cell utilized in the array of FIG. 1. As shown in FIG. 3, a transistor 31 is arranged so that its base 32 is coupled to a word line 33, its collector 34 is coupled to a bit/-sense line 35 and its emitter 36 is coupled through a capacitor 37 to ground. This cell operates identically to that of the cell shown in FIG. 1. The voltage pulses shown in FIG. 2 can also be utilized to operate this cell as well as the cell in FIG. 1.

If PNP devices were used in the cell in FIG. 1 or in the cell of FIG. 3, it would, of course, be necessary to reverse the polarities on both the bit line and the word lines, since PNP transistors need opposite type voltages to operate.

Figure 4:
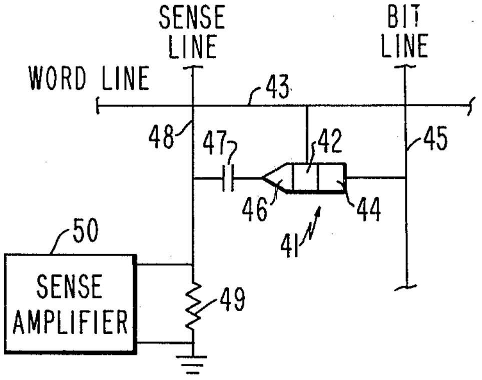
FIG. 4 shows still another embodiment of the cell array in FIG. 1.

FIG. 4 shows still another embodiment of the cell of FIG. 1. In this embodiment the bit/sense line has been split into separate bit and sense lines. As shown in FIG. 4, the cell comprises transistor 41 arranged with its base 42 coupled to a word line 43, its collector 44 coupled to a bit line 45 and its emitter 46 coupled through a capacitor 47 to a sense line 48. The sense line 48 is grounded through an impedance 49 with a sense amplifier 50 coupled across the impedance so that the signals stored in the capacitor can be detected during a read operation. Once again, the voltage pulses shown in FIG. 2 can be utilized with this configuration, to write, read and erase, both 0's and 1's.

It is also obvious that the transistor shown in FIG. 4 can be reversed in direction so that its collector is coupled through the capacitor to the sense line and its emitter is coupled to the bit line.

Each of these embodiments has its own advantage as to cell size versus cell speed especially when these arrays are to be built using integrated circuit techniques. In such integrated circuit arrays consideration must also be given to the use of either the so-called single layer metallurgy or the so-called double layer metallurgy for the layout of the bit and word lines.

The cell layout of FIG. 1 has the smallest cell area but a slow speed and requires the more complex double layer metallurgy.

The cell layout of FIG. 3 has the same speed as the cell of FIG. 1 and does not require double layer metallurgy but does require a larger cell area.

The cell layout of FIG. 4 on the other hand requires the largest cell layout area but is the fastest and does not use double layer metallurgy.

An alternate layer to that of FIG. 4 (not shown) has the transistor reversed so that the capacitor is connected between the collector and the sense line and the emitter is connected to the bit line. This arrangement will be as fast as the arrangement shown in FIG. 4, but will be smaller in area since it requires double layer metallurgy.

Thus there has been described a memory array which utilizes only a single bipolar transistor and a single capacitor in each memory or storage cell and which eliminates, through driving of the word and bit lines at various voltage levels, the need of a large resistive element in the base of the transistor device.

The described memory cells further have the advantage of being easily fabricated and compatible with the present solid state integrated circuit technologies and techniques.

It should be noted that although the embodiments described herein have been NPN transistors that PNP transistors can also be utilized although a reversal of voltage potentials described would be required to drive the PNP transistors.

While the invention has been particularly shown and described with reference to preferred embodiments thereof it will be understood by those skilled in the art that the foregoing and other changes in form and detail may be made therein without departing from the spirit and scope of the invention.

What is claimed is:

1. A semiconductor storage system comprising
a plurality of word lines,
a plurality of bit lines,
a plurality of memory cells, each of said memory cell being coupled to one of said word lines and one of said bit lines,
each of said memory cells comprising
only a transistor, having an emitter, a base and a collector,
and a charge storage means,
the emitter collector circuit of the transistor being coupled between the storage means and the bit line,
the base of the transistor being coupled to the word line,
and means for writing information into the reading information out of a selected memory cell comprising,
means for selectively setting a reference voltage on a selected word line to render the transistor in the cell nonconductive,
means for simultaneously setting on a selected bit line a quiescent voltage greater than the reference voltage applied to the word line,
means for raising the voltage on the word line to a first voltage greater than the reference voltage and sufficient to render the transistor conductive and simultaneously lowering the voltage on the bit line below the quiescent voltage to write a first binary information state in the cell by discharging the storage means,
and means for raising the voltage on the selected word line to a second voltage greater than the first voltage, while simultaneously maintaining the selected bit line at its quiescent voltage to read the charge state in the capacitor and to store charge in the capacitor to establish in the capacitor the second binary state.

2. A semiconductor storage system comprising
a plurality of word lines,
a plurality of bit lines,
a plurality of memory cells, each of said memory cells being coupled to one of said word lines and one of said bit lines,
each of said memory cells comprising
only a transistor, having an emitter, a base and a collector,
and a charge storage means,
the emitter collector circuit of the transistor being coupled between the storage means and the bit line,
the base of the transistor being coupled to the word line,
and means for writing information into and reading information out of selected memory cells,
and means comprising
first bias voltage means for selectively setting on a selected word line a first one of two different bias voltages of the same polarity,
second voltage bias for selective setting on a selected bit line a first one of two different bias voltages of the same polarity simultaneously with the application of the first bias voltage of the first voltage means to the selected word line to establish a uniform charge state in a selected charge storage means, and means for altering the voltage on the selected bit line to the other of said bias voltages, while simultaneously altering the bias voltage on the selected word line to the other of said bias voltages to read the charge state on the capacitor, said charge storage means comprising a capacitor having first and second terminals, one terminal of which is coupled to the emitter of said transistor and the other terminal is coupled to ground.

3. The memory of claim 2 wherein said charge storage means is a capacitor having first and second terminals the first of said terminals being coupled to said collector and the second of said terminals being coupled to ground.

4. The memory of claim 2 wherein there is further provided a separate sense line coupled to said collector-emitter circuit of said transistor.

5. The memory system of claim 4 wherein said charge storage means is a capacitor having first and second terminals said first terminal being coupled to the emitter of said transistor and said second terminal being coupled to said sense line.

6. The memory system of claim 4 wherein said charge storage means is a capacitor having first and second terminals, said first terminal being coupled to said collector of said transistor and said second terminal being coupled to said sense line.

7. A memory system having intersecting word lines and bit lines and semiconductor memory cells coupling said word and said bit lines, each memory cell comprising, a terminal, a capacitor, and a transistor having a base directly connected to one of said word lines and an emitter-collector circuit, said circuit forming a series circuit with said capacitor, said series circuit being coupled between said bit line and said terminal.

8. The memory system of claim 7 wherein said terminal is a point of reference potential.

9. The memory system of claim 7 wherein said terminal is ground.

10. The memory system of claim 7 wherein there is further provided means, including multilevel pulses of one polarity for writing information into and reading information out of said capacitor.

11. The memory system of claim 7 wherein said system further includes sense lines and said terminal is formed on one of said sense lines.

* * * * *